(12) United States Patent
Chen et al.

(10) Patent No.: US 8,782,164 B2
(45) Date of Patent: Jul. 15, 2014

(54) IMPLEMENTING ASYNCRONOUS COLLECTIVE OPERATIONS IN A MULTI-NODE PROCESSING SYSTEM

(75) Inventors: Dong Chen, Yorktown Heights, NY (US); Noel A. Eisley, Yorktown Heights, NY (US); Philp Heidelberger, Yorktown Heights, NY (US); Sameer Kumar, Yorktown Heights, NY (US); Valentina Salapura, Yorktown Heights, NY (US); Burkhard Steinmacher-Burow, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 606 days.

(21) Appl. No.: 12/697,043

(22) Filed: Jan. 29, 2010

(65) Prior Publication Data

US 2011/0191437 A1 Aug. 4, 2011

Related U.S. Application Data

(60) Provisional application No. 61/261,269, filed on Nov. 13, 2009, provisional application No. 61/293,611, filed on Jan. 8, 2010, provisional application No. 61/295,669, filed on Jan. 15, 2010.

(51) Int. Cl.
*G06F 15/16* (2006.01)
*G06F 12/00* (2006.01)

(52) U.S. Cl.
USPC ............................. 709/217; 709/212; 711/147

(58) Field of Classification Search
USPC .................. 709/204, 200, 217, 212; 719/315; 370/392; 712/35; 710/22, 24; 711/147
See application file for complete search history.

(56) References Cited

U.S. PATENT DOCUMENTS

| 2002/0129086 | A1* | 9/2002 | Garcia-Luna-Aceves et al. .............................. 709/200 |
| 2009/0003344 | A1* | 1/2009 | Kumar .......................... 370/392 |
| 2009/0006546 | A1* | 1/2009 | Blumrich et al. ............. 709/204 |
| 2009/0006810 | A1* | 1/2009 | Almasi et al. .................... 712/35 |
| 2009/0007140 | A1 | 1/2009 | Jia |
| 2009/0007141 | A1* | 1/2009 | Blocksome et al. .......... 719/315 |
| 2009/0031055 | A1* | 1/2009 | Archer et al. ................... 710/24 |
| 2009/0210635 | A1 | 8/2009 | Blackmore et al. |
| 2011/0010471 | A1* | 1/2011 | Heidelberger et al. ......... 710/22 |

* cited by examiner

*Primary Examiner* — Jungwon Chang
(74) *Attorney, Agent, or Firm* — Scully, Scott, Murphy & Presser PC; Daniel P. Morris, Esq.

(57) ABSTRACT

A method, system, and computer program product are disclosed for implementing an asynchronous collective operation in a multi-node data processing system. In one embodiment, the method comprises sending data to a plurality of nodes in the data processing system, broadcasting a remote get to the plurality of nodes, and using this remote get to implement asynchronous collective operations on the data by the plurality of nodes. In one embodiment, each of the nodes performs only one task in the asynchronous operations, and each nodes sets up a base address table with an entry for a base address of a memory buffer associated with said each node. In another embodiment, each of the nodes performs a plurality of tasks in said collective operations, and each task of each node sets up a base address table with an entry for a base address of a memory buffer associated with the task.

25 Claims, 4 Drawing Sheets

IMPLEMENTING ASYNCRONOUS COLLECTIVE OPERATIONS IN A MULTI-NODE PROCESSING SYSTEM

GOVERNMENT CONTRACT

This invention was made with government support under Contract No. B554331 awarded by the Department of Energy. The Government has certain rights in this invention.

CROSS-REFERENCE TO RELATED APPLICATIONS

This application claims the benefit of U.S. Patent Application Ser. No. 61/261,269, filed Nov. 13, 2009 for "LOCAL ROLLBACK FOR FAULT-TOLERANCE IN PARALLEL COMPUTING SYSTEMS"; 61/293,611, filed Jan. 8, 2010 for "A MULTI-PETASCALE HIGHLY EFFICIENT PARALLEL SUPERCOMPUTER"; and 61/295,669, filed Jan. 15, 2010 for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT", the entire content and disclosure of each of which is incorporated herein by reference; and is related to the following commonly-owned, pending U.S. Patent Applications, the entire contents and disclosure of each of which is expressly incorporated by reference herein as if fully set forth herein: U.S. patent application Ser. No. 12/684,367, filed Jan. 8, 2010, for "USING DMA FOR COPYING PERFORMANCE COUNTER DATA TO MEMORY"; U.S. patent application Ser. No. 12/684,172, filed Jan. 8, 2010 for "HARDWARE SUPPORT FOR COLLECTING PERFORMANCE COUNTERS DIRECTLY TO MEMORY"; U.S. patent application Ser. No. 12/684,190, filed Jan. 8, 2010 for "HARDWARE ENABLED PERFORMANCE COUNTERS WITH SUPPORT FOR OPERATING SYSTEM CONTEXT SWITCHING"; U.S. patent application Ser. No. 12/684,496, filed Jan. 8, 2010 for "HARDWARE SUPPORT FOR SOFTWARE CONTROLLED FAST RECONFIGURATION OF PERFORMANCE COUNTERS"; U.S. patent application Ser. No. 12/684,429, filed Jan. 8, 2010, for "HARDWARE SUPPORT FOR SOFTWARE CONTROLLED FAST MULTIPLEXING OF PERFORMANCE COUNTERS"; U.S. patent application Ser. No. 12/697,799 filed Feb. 1, 2010, for "CONDITIONAL LOAD AND STORE IN A SHARED CACHE"; U.S. patent application Ser. No. 12/684,738, filed Jan. 8, 2010, for "DISTRIBUTED PERFORMANCE COUNTERS"; U.S. patent application Ser. No. 12/684,860, filed Jan. 8, 2010, for "PAUSE PROCESSOR HARDWARE THREAD ON PIN"; U.S. patent application Ser. No. 12/684,174, filed Jan. 8, 2010, for "PRECAST THERMAL INTERFACE ADHESIVE FOR EASY AND REPEATED, SEPARATION AND REMATING"; U.S. patent application Ser. No. 12/684,184, filed Jan. 8, 2010, for "ZONE ROUTING IN A TORUS NETWORK"; U.S. patent application Ser. No. 12/684,852, filed Jan. 8, 2010, for "PROCESSOR RESUME UNIT"; U.S. patent application Ser. No. 12/684,642, filed Jan. 8, 2010, for "TLB EXCLUSION RANGE"; U.S. patent application Ser. No. 12/684,804, filed Jan. 8, 2010, for "DISTRIBUTED TRACE USING CENTRAL PERFORMANCE COUNTER MEMORY"; U.S. patent application Ser. No. 61/293,237, filed Jan. 8, 2010, for "ORDERING OF GUARDED AND UNGUARDED STORES FOR NO-SYNC I/O"; U.S. patent application Ser. No. 12/693,972, filed Jan. 26, 2010, for "DISTRIBUTED PARALLEL MESSAGING FOR MULTIPROCESSOR SYSTEMS"; U.S. patent application Ser. No. 12/688,747, filed Jan. 15, 2010, for "Support for non-locking parallel reception of packets belonging to the same reception FIFO"; U.S. patent application Ser. No. 12/688,773, filed Jan. 15, 2010, for "OPCODE COUNTING FOR PERFORMANCE MEASUREMENT"; U.S. patent application Ser. No. 12/684,776, filed Jan. 8, 2010, for "MULTI-INPUT AND BINARY REPRODUCIBLE, HIGH BANDWIDTH FLOATING POINT ADDER IN A COLLECTIVE NETWORK"; U.S. patent application Ser No. 12/984,252 filed Jan. 4, 2011, for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT"; U.S. patent application Ser. No. 13/008,502 filed on Jan. 18, 2011 for "MEMORY SPECULATION IN A MULTI LEVEL CACHE SYSTEM"; U.S. patent application Ser. No. 13/008,583 filed Jan. 18, 2011, for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT"; U.S. patent application Ser. No. 12/984,308 filed Jan. 4, 2011, for "MINIMAL FIRST LEVEL CACHE SUPPORT FOR MEMORY SPECULATION MANAGED BY LOWER LEVEL CACHE"; U.S. patent application Ser. No.12/984,329 filed Jan. 4, 2011 for "PHYSICAL ADDRESS ALIASING TO SUPPORT MULTI-VERSIONING IN A SPECULATION-UNAWARE CACHE"; U.S. patent application Ser. No. 61/293,552, filed Jan. 8, 2010, for "LIST BASED PREFETCH"; U.S. patent application Ser. No. 12/684,693, filed Jan. 8, 2010, for "PROGRAMMABLE STREAM PREFETCH WITH RESOURCE OPTIMIZATION"; U.S. patent application Ser No. 61/293,494, filed Jan. 8, 2010, for "NON-VOLATILE MEMORY FOR CHECKPOINT STORAGE"; U.S. patent application Ser. No. 61/293, 476, filed Jan. 8, 2010, for "NETWORK SUPPORT FOR SYSTEM INITIATED CHECKPOINTS"; U.S. patent application Ser. No. 61/293,554, filed Jan. 8, 2010, for "TWO DIFFERENT PREFETCHING COMPLEMENTARY ENGINES OPERATING SIMULTANEOUSLY"; U.S. patent application Ser. No. 12/697,015 filed Jan. 29, 2010, for "DEADLOCK-FREE CLASS ROUTES FOR COLLECTIVE COMMUNICATIONS EMBEDDED IN A MULTI-DIMENSIONAL TORUS NETWORK"; U.S. patent application Ser. No. 61/293,559, filed Jan. 8, 2010, for "IMPROVING RELIABILITY AND PERFORMANCE OF A SYSTEM-ON-A-CHIP BY PREDICTIVE WEAR-OUT BASED ACTIVATION OF FUNCTIONAL COMPONENTS"; U.S. patent application Ser. No. 61/293,569, filed Jan. 8, 2010, for "IMPROVING THE EFFICIENCY OF STATIC CORE TURNOFF IN A SYSTEM-ON-A-CHIP WITH VARIATION"; U.S. patent application Ser. No. 13/008,546 filed Jan. 18, 2011, for "MULTIFUNCTIONING CACHE"; U.S. patent application Ser. No. 12/697,175 filed Jan. 29, 2010, for "I/O ROUTING IN A MULTIDIMENSIONAL TORUS NETWORK"; U.S. patent application Ser. No. 12/684,287, filed Jan. 8, 2010 for "ARBITRATION IN CROSSBAR INTERCONNECT FOR LOW LATENCY";

U.S. patent application Ser. No. 12/684,630, filed Jan. 8, 2010 for "EAGER PROTOCOL ON A CACHE PIPELINE DATAFLOW"; U.S. patent application Ser. No. 12/723,277 filed Mar. 12, 2010 for "EMBEDDING GLOBAL BARRIER AND COLLECTIVE IN A TORUS NETWORK"; U.S. patent application Ser. No. 12/696,764 filed on Jan. 29, 2010, now U.S. Pat. No. 8,412,974, now U.S. patent application Ser. No. 12/696,764 filed Jan. 29, 2010 for "GLOBAL SYNCHRONIZATION OF PARALLEL PROCESSORS USING CLOCK PULSE WIDTH MODULATION"; U.S. patent application Ser. No. 61/293,266, filed Jan. 8, 2010, U.S. patent application Ser. No. 12/796,411 filed Jun. 8, 2010 for "IMPLEMENTATION OF MSYNC"; U.S. patent application Ser. No. 12/796,389 filed Jun. 8, 2010 for "NON-STANDARD FLAVORS OF MSYNC"; U.S. patent application Ser. No. 12/696,817 filed Jan. 29, 2010 for "HEAP/STACK GUARD PAGES USING A WAKEUP UNIT"; U.S. patent application Ser. No. 61/293,603, filed Jan. 8, 2010 for "MECHANISM OF SUPPORTING SUB-COMMUNICATOR COLLECTIVES WITH O(64) COUNTERS AS OPPOSED TO ONE COUNTER FOR EACH SUB-COMMUNICATOR"; and U.S. patent application Ser. No. 12/774,475 filed May 5, 2010 for "REPRODUCIBILITY IN A MULTIPROCESSOR SYSTEM".

BACKGROUND OF THE INVENTION

1. Field of the Invention

The present invention, generally, relates to collective operations in data processing systems, and more specifically, to asynchronous collective operations in multimode data processing systems.

2. Background Art

Parallel computer applications often use message passing to communicate between processors. Message passing utilities such as the Message Passing Interface (MPI) support two types of communication: point-to-point and collective. In point-to-point messaging, a processor sends a message to another processor that is ready to receive it. In a collective communication operation, however, many processors participate together in the communication operation.

Collective communication operations play a very important role in high performance computing. In collective communication, data are redistributed cooperatively among a group of processes. Sometimes the redistribution is accompanied by various types of computation on the data and it is the results of the computation that are redistributed. MPI, which is the de facto message passing programming model standard, defines a set of collective communication interfaces, including MPI_BARRIER, MPI_EBCAST, MPI_REDUCE, MPI_ALLREDUCE, MPI_ALLGATHER, MPI_ALLTOALL etc. These are application level interfaces and are more generally referred to as APIs. In MPI, collective communications are carried out on communicators which define the participating processes and a unique communication context.

Functionally, each collective communication is equivalent to a sequence of point-to-point communications, for which MPI defines MPI_SEND, MPI_RECEIVE and MPI_WAIT interfaces (and variants). MPI collective communication operations are implemented with a layered approach in which the collective communication routines handle semantic requirements and translate the collective communication function call into a sequence of SFND/RECV/WAIT operations according to the algorithms used. The point-to-point communication protocol layer guarantees reliable communication.

Collective communication operations can be synchronous or asynchronous. In a synchronous collective operation all processors have to reach the collective before any data movement happens on the network. For example, all processors need to make the collective API or function call before any data movement happens on the network. Synchronous collectives also ensure that all processors are participating in one or more collective operations that can be determined locally. In an asynchronous collective operation, there are no such restrictions and processors can start sending data as soon as the processors reach the collective operation. With asynchronous collective operations, several collectives can be happening simultaneously at the same time.

Asynchronous one-sided collectives that do not involve participation of the intermediate and destination processors are critical for achieving good performance in a number of programming paradigms. For example, in an async one-sided broadcast, the root initiates the broadcast and all destination processors receive the broadcast message without any intermediate nodes forwarding the broadcast message to other nodes.

BRIEF SUMMARY

Embodiments of the invention provide a method, system, and computer program product for implementing an asynchronous collective operation in a multi-node data processing system. In one embodiment, the method comprises sending data to a plurality of nodes in the data processing system, broadcasting a remote get to said plurality of nodes, and using said remote get to implement asynchronous collective operations on said data by the plurality of nodes.

In an embodiment, each of said plurality of nodes sets up a base address table with an entry for the source memory buffer associated with said each node's contribution to the global sum.

In an embodiment, each of said plurality of nodes sets up a base address table with an entry for the address to the destination memory buffer on the target where the summed output is copied to.

In an embodiment, all the nodes have the same physical address for the source buffer and this address is placed once in the remote get descriptor payload (this is an optimization to reduce of the base address table by eliminating injection source buffers from it).

In an embodiment, each compute node has N processes and the root node initiates N remote get operations (one for each process) to complete the one-sided reduce operation and then does a local sum to complete the one-sided reduce.

In an embodiment, the invention provides a mechanism for a Messaging Unit to initiate a one-sided allreduce operation by injecting a remote get descriptor that is broadcast to all the compute nodes and initiates a global-sum operation back to the initiating node or an arbitrary target node.

In one embodiment, each of said plurality of nodes sets up a base address table with an entry for a base address of a memory buffer associated with said each node. In an embodiment, said broadcasting includes sending a defined communication to said plurality of destination nodes, and injecting a remote get descriptor into said defined communication. In an embodiment, said remote get descriptor includes a put that reduces data back to a root node during said asynchronous collective operations. In an embodiment, each of said plurality of nodes performs only one task in the asynchronous collective operation.

In one embodiment, each of the plurality of destination nodes performs a plurality of tasks in the collective operations, and each of the tasks of each of said plurality of nodes sets up a base address table with an entry for a base address of a memory buffer associated with said each task. In an embodiment, said broadcasting includes sending a communication to said plurality of destination nodes, and injecting a remote get descriptor into said communication. In an embodiment, said descriptor includes a put that reduces data back to a root node. In one embodiment, said put reduces data back to the root node from a first of the tasks performed by each of the nodes during the collective operation, and said broadcasting includes sending a put to each of the tasks of each of the nodes to reduce data from said each task to the root node.

In one embodiment, the invention uses the remote get collective to implement one-sided operations. The compute node kernel (CNK) operating system allows each MPI task to map the virtual to physical addresses of all the other tasks in the booted partition. Moreover the remote-get and direct put descriptors take physical address of the input buffers.

DETAILED DESCRIPTION

Figure 1:
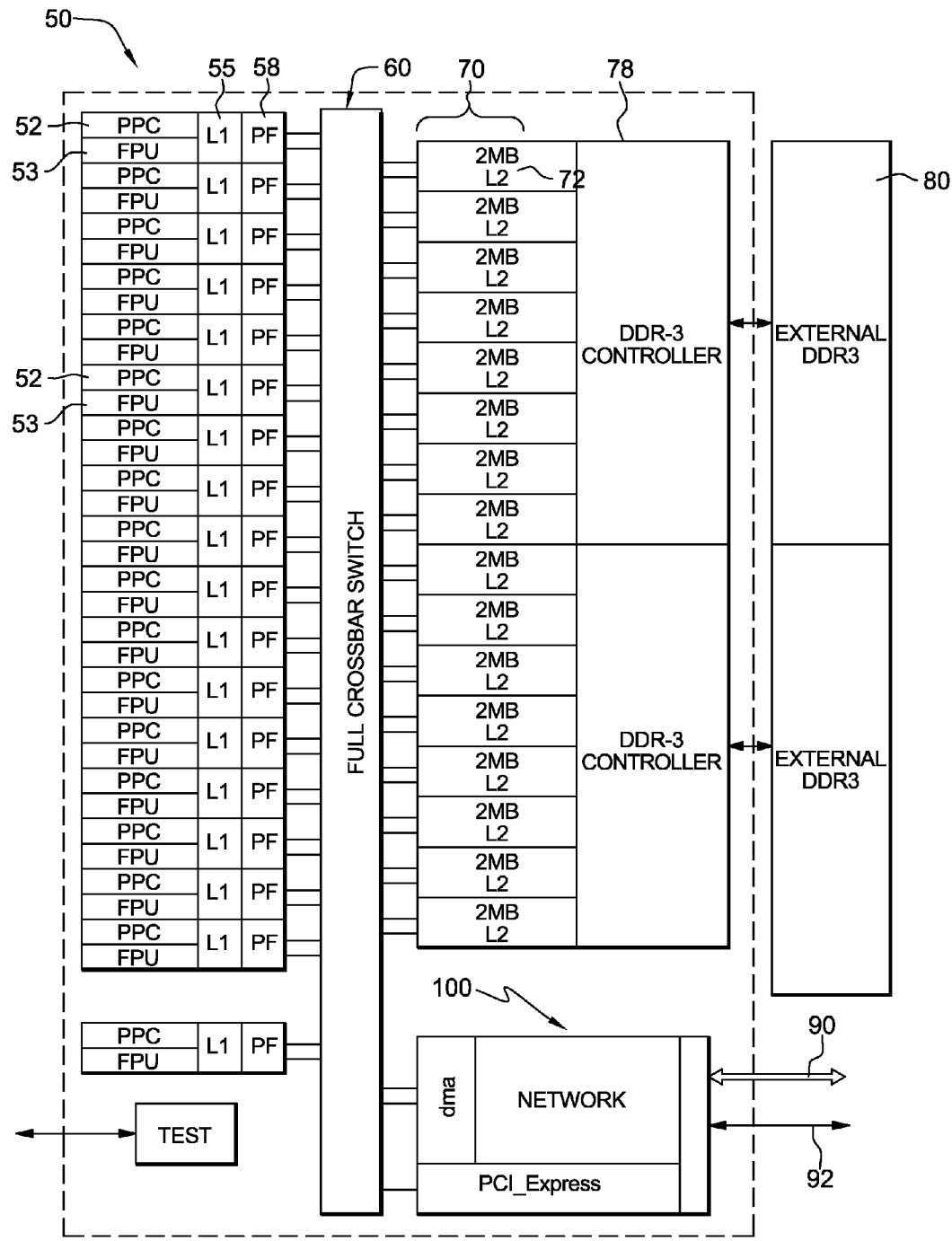
FIG. 1 is a block diagram of a data processing system in accordance with an embodiment of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1, there is shown the overall architecture of the multiprocessor computing node 50 implemented in a parallel computing system in which the present invention is implemented. In one embodiment, the multiprocessor system implements the proven Blue Gene® architecture, and is implemented in a BluGene/Q massively parallel computing system comprising, for example, 1024 compute node ASICs (BCQ), each including multiple processor cores.

The compute node 50 is a single chip ("nodechip") based on low power A2 PowerPC cores, though the architecture can use any low power cores, and may comprise one or more semiconductor chips. In the embodiment depicted, the node includes 16 PowerTC A2 at 1600 MHz, in cores in one embodiment.

More particularly, the basic nodechip 50 of the massively parallel supercomputer architecture illustrated in FIG. 1 includes (sixteen or seventeen) 16+1 symmetric multiprocessing (SMP) cores 52, each core being 4-way hardware threaded supporting transactional memory and thread level speculation, and, including a Quad Floating Point Unit (FPU) 53 on each core (204.8 GF peak node). In one implementation, the core operating frequency target is 1.6 GHz providing, for example, a 563 GB/s bisection bandwidth to shared L2 cache 70 via a full crossbar switch 60. In one embodiment, there is provided 32 MB of shared L2 cache 70, each core having associated 2 MB of L2 cache 72. There is further provided external DDR SDRAM (e.g., Double Data Rate synchronous dynamic random access) memory 80, as a lower level in the memory hierarchy in communication with the L2. In one embodiment, the node includes 42.6 GB/s DDR3 bandwidth (1.333 GHz DDR3) (2 channels each with chip kill protection).

Each FPU 53 associated with a core 52 has a 32 B wide data path to the L1-cache 55 of the A2, allowing it to load or store 32 B per cycle from or into the L1-cache 55. Each core 52 is directly connected to a private prefetch unit (level-1 prefetch, L1P) 58, which accepts, decodes and dispatches all requests sent out by the A2. The store interface from the A2 core 52 to the L1P 55 is 32 B wide and the load interface is 16 B wide, both operating at processor frequency. The L1P 55 implements a fully associative, 32 entry prefetch buffer. Each entry can hold an L2 line of 128 B size. The L1P provides two prefetching schemes for the private prefetch unit 58: a sequential prefetcher as used in previous BlueGene architecture generations, as well as a list prefetcher.

As shown in FIG. 1, the 32 MiB shared L2 is sliced into 16 units, each connecting to a slave port of the switch 60. Every physical address is mapped to one slice using a selection of programmable address bits or a XOR-based hash across all address bits. The L2-cache slices, the L1Ps and the L1-D caches of the A2s are hardware-coherent. A group of 4 slices is connected via a ring to one of the two DDR3 SDRAM controllers 78.

By implementing a direct memory access engine referred to herein as a Messaging Unit, "MU" such as MU 100, with each MU including a DMA engine and Network Card interface in communication with the XBAR switch, chip I/O functionality is provided. In one embodiment, the compute node further includes, in a non-limiting example: 10 intra-rack interprocessor links 90, each at 2.0 GB/s, for example, i.e., 10*2 GB/s intra-rack & inter-rack (e.g., configurable as a 5-D torus in one embodiment); and, one I/O link 92 interfaced with the MU at 2.0 GB/s (2 GB/s I/O link (to I/O subsystem)) is additionally provided. The system node employs or is associated and interfaced with a 8-16 GB memory/node. The ASIC may consume up to about 30 watts chip power.

Although not shown, each A2 core has associated a quad-wide fused multiply-add SIMD floating point unit, producing 8 double precision operations per cycle, for a total of 128 floating point operations per cycle per compute chip. A2 is a 4-way multi-threaded 64 b PowerPC implementation. Each A2 core has its own execution unit (XU), instruction unit (IU), and quad floating point unit (QPU) connected via the AXU (Auxiliary eXecution Unit) (FIG. 1). The QPU is an implementation of the 4-way SIND QPX floating point instruction set architecture. QPX is an extension of the scalar PowerPC floating point architecture. It defines 32 32 B-wide floating point registers per thread instead of the traditional 32 scalar 8 B-wide floating point registers.

Figure 2:
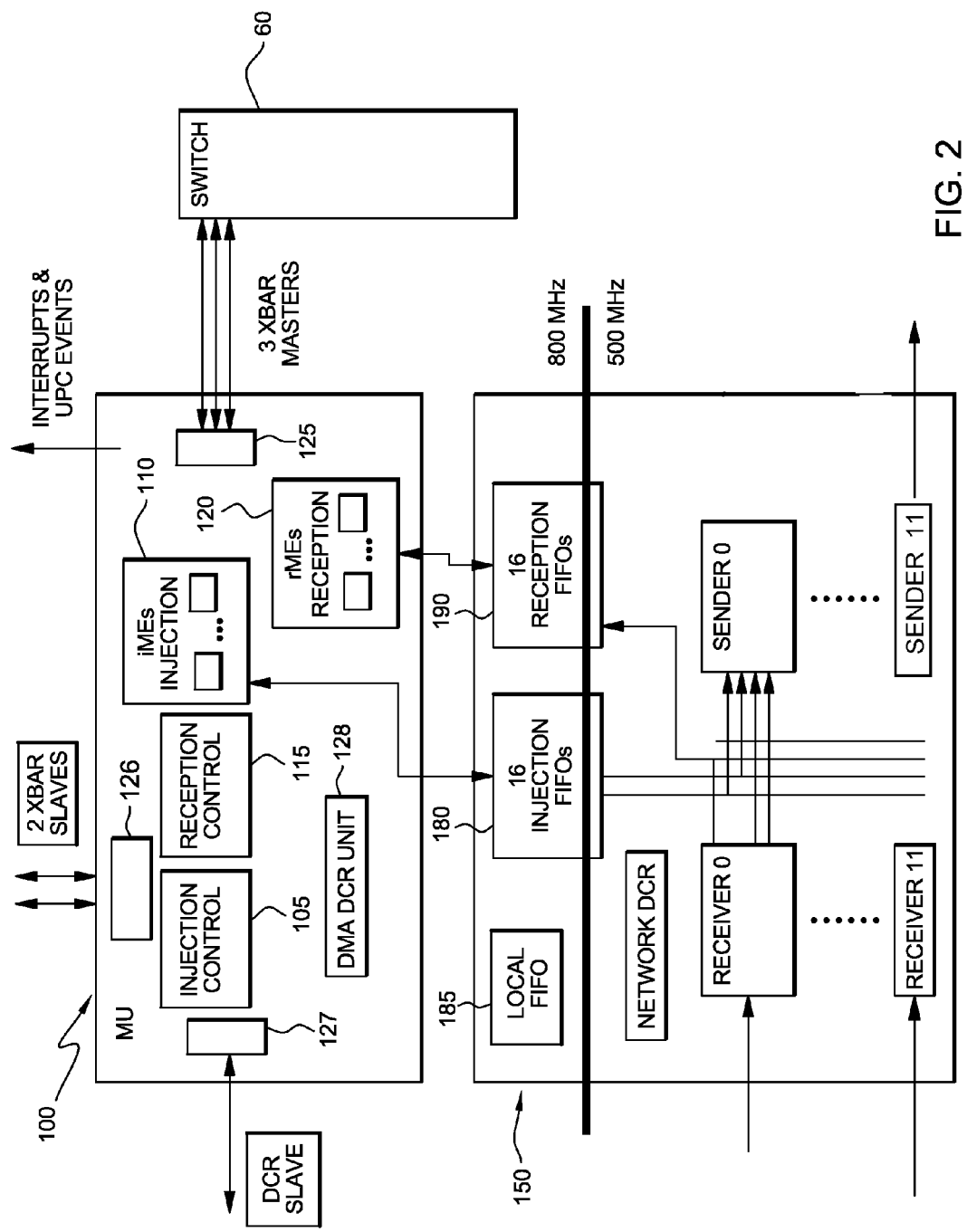
FIG. 2 shows a messaging unit implemented by the node chip of FIG. 1.

As mentioned above, the compute nodechip implements a direct memory access engine referred to herein as a Messaging Unit, "MU." One embodiment of an MU is shown in FIG. 2 at 100. MU 100 transfers blocks via three switch master ports between the L2-caches 70 (FIG. 1) and the reception FIFOs 190 and transmission FIFOs 180 of the network interface 150. It is controlled by the cores via memory mapped I/O access through an additional switch slave port.

In one embodiment, one function of the messaging unit 100 is to ensure optimal data movement to, and from the network into the local memory system. It supports injection and reception of messages, as well as data prefetching into the memory, and on-chip memory copy. On the injection side, the MU splits and packages messages into network packets, and sends packets to the network respecting the network protocol. On packet injection, the messaging unit distinguishes between packet injection, and memory prefetching packets. A memory prefetch mode is supported in which the MU fetches a message into L2, but does not send it. On the reception side, it receives network packets, and writes them into the appropriate location in memory, depending on the network protocol. On packet reception, the messaging unit 100 distinguishes between three different types of packets, and accordingly performs different operations. The types of packets supported are: memory FIFO packets, direct put packets, and remote get packets.

The messaging unit also supports local memory copy, where the MU copies an area in the local memory to another area in the memory. For memory-to-memory on chip data transfer, a ded icated SRAM buffer, located in the network device, is used. Remote gets and the corresponding direct puts can be "paced" by software to reduce contention within the network. In this software-controlled paced mode, a remote get for a long message is broken up into multiple remote gets, each for a sub-message. The sub-message remote get is only allowed to enter the network if the number of packets belonging to the paced remote get active in the network is less than an allowed threshold. Software has to carefully control the pacing, otherwise deadlocks can occur.

The top level architecture of the Messaging Unit 100 interfacing with the Network interface Device (ND) 150 is shown in FIG. 2. The Messaging Unit 100 functional blocks involved with injection control as shown in FIG. 2 includes the following: Injection control units 105 implementing logic for queuing and arbitrating the processors' requests to the control areas of the injection MU; Reception control units 115 Implementing logic for queuing and arbitrating the requests to the control areas of the reception MU; Injection iMEs (injection Message Elements) 110 that reads data from L2 cache or DDR memory and inserts it in the network injection FIFOs 180, or in the local copy FIFO 185. Reception rMEs (reception Message Elements) 120 that reads data from the network reception FIFOs 90, and inserts them into L2. In one embodiment, there are 16 rMEs 120, one for each network reception FIFO. A DCR Unit 128 is provided that includes DCR registers for the MU 100.

The MU 100 further includes an Interface to a cross-bar switch (XBAR) switch 55 (or SerDes) switches in additional implementations. The MU operates at clock/2 (e.g., 800 MHz). The Network Device 150 operates at 500 MHz (e.g., 2 GB/s network). The MU 100 includes three (3) Xbar masters 125 to sustain network traffic and two (2) Xbar slaves 126 for programming. A DCR slave interface unit 127 is also provided.

The handover between network device 150 and MU 100 is performed via 2-port SRAMs for network injection/reception FIFOs. The MU 100 reads/writes one port using, for example, an 800 MHz clock, and the network reads/writes the second port with a 500 MHz clock. The only handovers are through the FIFOs and FIFOs' pointers (which are implemented using latches).

The injection side MU maintains injection FIFO pointers, as well as other hardware resources for putting messages into the 5-D torus network. Injection FIFOs are allocated in main memory and each FIFO contains a number of message descriptors. Each descriptor is 64 bytes in length and includes a network header for routing, the base address and length of the message data to be sent, and other fields like type of packets, etc., for the reception MU at the remote node. A processor core prepares the message descriptors in injection FIFOs and then updates the corresponding injection FIFO pointers in the MU. The injection MU reads the descriptors and message data packetizes messages into network packets and then injects them into the 5-D torus network.

Three types of network packets are supported: (1) Memory FIFO packets: the reception MU writes packets including both network headers and data payload into pre-allocated reception FIFOs in main memory. The MU maintains pointers to each reception FIFO. The received packets are further processed by the cores; (2) Put packets; the reception MU writes the data payload of the network packets into main memory directly, at addresses specified in network headers. The MU updates a message byte count after each packet is received. Processor cores are not involved in data movement, and only have to check that the expected numbers of bytes are received by reading message byte counts; (3) Get packets; the data payload contains descriptors for the remote nodes. The MU on a remote node receives each get packet into one of its injection FIFOs, then processes the descriptors and sends data back to the source node.

All MU resources are in memory mapped I/O address space and provide uniform access to all processor cores. In practice, the resources are likely grouped into smaller groups to give each core dedicated access. The preferred embodiment is to support 544 injection FIFOs, or 32/core, and 288 reception FIFOs, or 16/core. The reception byte counts for put messages are implemented in L2 using atomic counters. There is effectively an unlimited number of counters subject to the limit of available memory for such atomic counters.

The MU interface is designed to deliver close to the peak 18 GB/s (send)+18/GBs (receive) 5-D torus nearest neighbor data bandwidth, when the message data is fully contained in the 32 MB L2. This is basically 1.8 GB/s+1.8 GB/s maximum data payload bandwidth over 10 torus links. When the total message data size exceeds the 32 MB L2, the maximum network bandwidth is then limited by the sustainable external DDR memory bandwidth.

The torus network supports both point to point operations and collective communication operations. The collective communication operations supported are barrier, broadcast, reduce and allreduce. For example, a broadcast put descriptor will place the broadcast payload on all the nodes in the class route (a predetermined route set up for a group of nodes in the MPI communicator). Similarly there are collective put reduce and broadcast operations. A remote get (with a reduce put payload can be broadcast) to all the nodes from where data will be reduced via the put descriptor.

Figure 3:
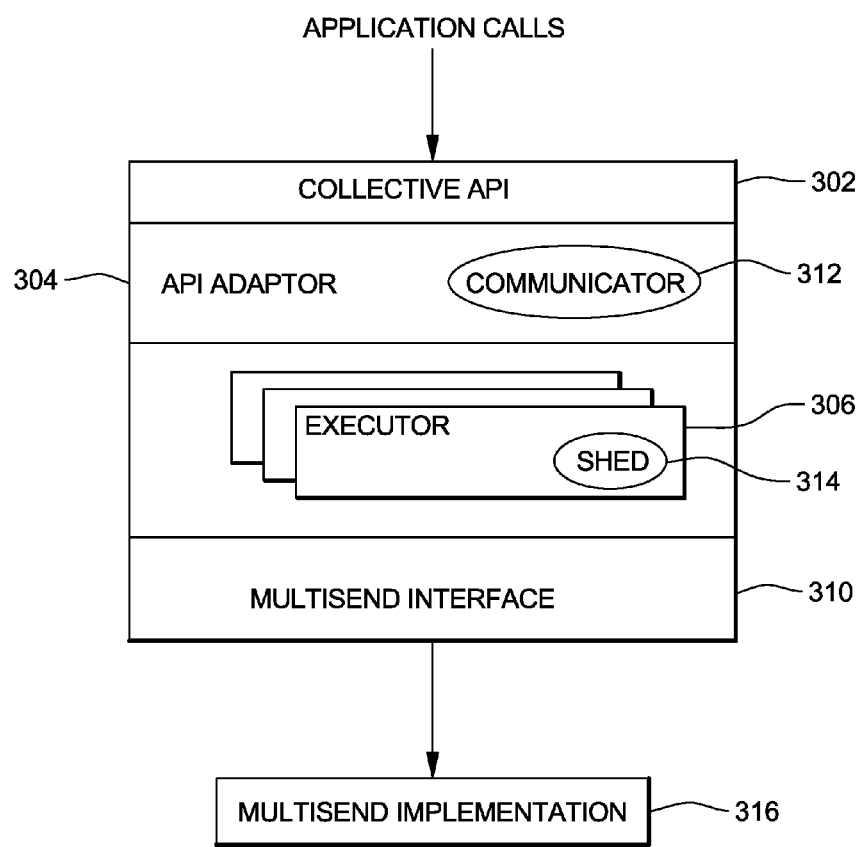
FIG. 3 illustrates a set of components used to implement collective communications in a multi-node processing system.

FIG. 3 illustrates a set of components that support collective operations in a multi-node processing system. These components include a collective API 302, language adapter 304, executor 306, and multisend interface 310.

Each application or programming language may implement a collective API 302 to invoke or call collective operation functions. A user application for example implemented in that application programming language then may make the appropriate function calls for the collective operations. Collective operations may be then performed via the API adaptor 304 using its internal components such as an MPI communicator 312, in addition to the other components in the collective framework, such as scheduler 314, executor 306, and multisend interface 310.

Language adaptor 304 interfaces the collective framework to a programming language. For example, a language adaptor such as for a message passing interface (MPI) has a communicator component 312. Briefly, an MPI communicator is an object with a number of attributes and rules that govern its creation, use, and destruction. The communicator 312 determines the scope and the "communication universe" in which a point-to-point or collective operation is to operate. Each communicator 312 contains a group of valid participants and the source and destination of a message is identified by process rank within that group.

Executor 306 may handle functionalities for specific optimizations such as pipelining, phase independence and multi-color routes. An executor may query a schedule on the list of tasks and execute the list of tasks returned by the scheduler 314. Typically, each collective operations is assigned one executor.

The scheduler 314 handles a functionality of collective operations and algorithms, and includes a set of steps in the collective algorithm that execute a collective operation. Scheduler 314 may split a collective operation into phases. For example, a broadcast can be done through a spanning tree schedule where in each phase, a message is sent from one node to the next level of nodes in the spanning tree. In each phase, scheduler 314 lists sources that will send a message to a processor and a list of tasks that need to be performed in that phase.

Multisend interface 310 provides an interface to multisend 316, which is a message passing backbone of a collective framework. Multisend functionality allows sending many messages at the same time, each message or a group of messages identified by a connection identifier. Multisend functionality also allows an application to multiplex data on this connection identifier.

As mentioned above, asynchronous one-sided collectives that do not involve participation of the intermediate and destination processors are critical for achieving good performance in a number of programming paradigms. For example, in an async one-sided broadcast, the root initiates the broadcast and all destination processors receive the broadcast message without any intermediate nodes forwarding the broadcast message to other nodes.

Embodiments of the present invention provide a method and system for one-sided asynchronous reduce operation. Embodiments of the invention use the remote get collective to implement one-sided operations. The compute node kernel (CNK) operating system allows each MN task to map the virtual to physical addresses of all the other tasks in the booted partition. Moreover the remote-get and direct put descriptors take physical address of the input buffers.

Two specific example embodiments are described below. One embodiment, represented in FIG. 4, may be used when there is only one task per node; and a second embodiment, represented in FIG. 5, may be used when there is more than one task per node.

Figure 4:
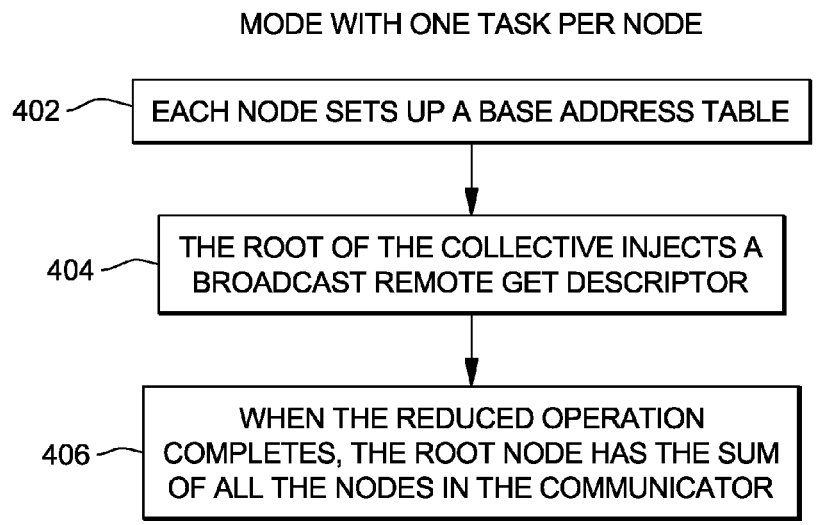
FIG. 4 illustrates a procedure, in accordance with an embodiment of the invention, for a one-sided asynchronous reduce operation when there is only one task per node.

With reference to FIG. 4, at step 402, each node sets up a base address table with an entry for the base address of the buffer to be reduced. At step 404, the root of the collective injects a broadcast remote get descriptor whose payload is a put that reduces data back to the root node. The offset on each node must be the same from the address programmed in the base address table. This is common in PGAS runtimes where the same array index must be reduced on all the nodes. At step 406, when the reduce operation completes, the root node has the sum of all the nodes in the communicator.

Figure 5:
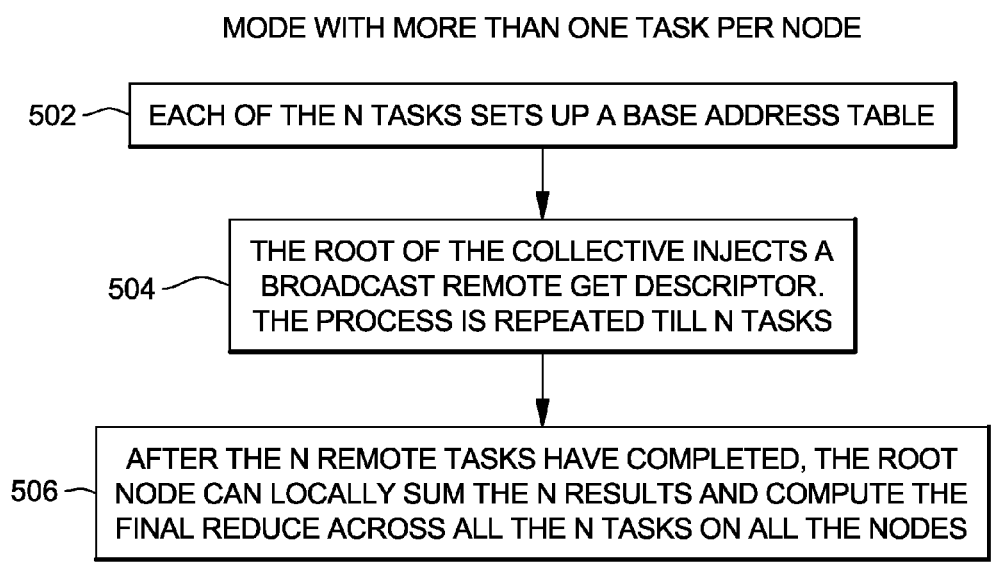
FIG. 5 shows a procedure, in accordance with another embodiment of the invention, for a one-sided asynchronous reduce operation when there is more than one task per node.

In the procedure illustrated in FIG. 5, at step 502, each of the n tasks set up a base address table with an entry for the base address of the buffer to be reduced. At step 504, the root of the collective injects a broadcast remote get descriptor whose payload is a put that reduces data back to the root node for task 0 on each node of the communicator. The offset on each node must be the same from the address programmed in the base address table. The root then injects a collective remote get for task 1 and the process is repeated till n tasks. As the remote gets are broadcast in a specific order, the reduce results will also complete in that order. At step 506, after the n remote gets have completed, the root node can locally sum the n results and compute the final reduce across all the n tasks on all the nodes.

While it is apparent that the invention herein disclosed is well calculated to fulfill the objects discussed above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of implementing an asynchronous collective operation in a multi-node data processing system, wherein each of the nodes includes a plurality of processing units and a messaging unit to implement direct memory access to the processing units of others of the nodes, the method comprising:
using the messaging unit of one of the nodes to initiate a one sided global collective operation by injecting a remote get descriptor and broadcasting the remote get descriptor from said one of the nodes to a plurality of others of the nodes; and
said remote get descriptor initiating said global collective operation back to a specified one of the nodes wherein data are sent in an asynchronous manner in the data processing system from each of the plurality of nodes to said specified one of the nodes.

2. The method according to claim 1, wherein each of said plurality of nodes sets up a base address table with an entry for the source memory buffer associated with said each node's contribution to the global sum.

3. The method according to claim 1, wherein each of said plurality of nodes sets up a base address table with an entry for the address to the destination memory buffer on the target where the summed output is copied to.

4. The method according to claim 1 where all the plurality of nodes have the same physical address for a source buffer for use in said one of the collective operations, and this address is placed once in a payload of the remote get descriptor.

5. The method according to claim 1, where each compute node has N processes and the root node initiates N remote get operations, one for each process, to complete the one-sided reduce operation and then does a local sum to complete the one-sided reduce.

6. The method according to claim 1, wherein said broadcasting includes sending a defined communication to said plurality of destination nodes, and injecting a remote get descriptor into said defined communication, and wherein said remote get descriptor includes a put that reduces data back to a root node during said asynchronous collective operations.

7. The method according to claim 1, wherein each of said plurality of nodes performs only one task in said asynchronous collective operations.

8. The method according to claim 7, wherein said broadcasting includes sending a put to each of the tasks of each of the nodes to reduce data from said each task to a root node.

9. The method according to claim 1, wherein each of the plurality of destination nodes performs a plurality of tasks in said collective operations, and wherein each of the tasks of each of said plurality of nodes sets up a base address table with an entry for a base address of a memory buffer associated with said each task.

10. The method according to claim 9, wherein
said broadcasting includes sending a communication to said plurality of destination nodes, and injecting a remote get descriptor into said communication;
said descriptor includes a put that reduces data back to a root node;
said put reduces data back to the root node form a first of the tasks performed by each of the nodes during said collective operations.

11. A system for implementing an asynchronous collective operation in a multi-node data processing system, wherein each of the nodes includes a plurality of processing units and a messaging unit to implement direct memory access to the processing units of others of the nodes, the system comprising one or more processing nodes of the data processing system configured for:
using the messaging unit of one of the nodes to initiate a one sided global collective operation by injecting a remote get descriptor and broadcasting the remote get descriptor from said one of the nodes to a plurality of others of the nodes; and
said remote get descriptor initiating said global collective operation back to a specified one of the nodes wherein data are sent in an asynchronous manner in the data processing system from each of the plurality of nodes to said specified one of the nodes.

12. The system according to claim 11, wherein the broadcasting includes using a mechanism for said Messaging Unit to initiate a one-sided allreduce operation by injecting a remote get descriptor that is broadcast to all the compute nodes and initiates a global-sum operation back to the initiating node or an arbitrary target node.

13. The system according to claim 11, wherein each of said plurality of nodes sets up a base address table with an entry for a base address of a memory buffer associated with said each node.

14. The system according to claim 11, wherein each of the plurality of destination nodes performs a plurality of tasks in said collective operations, and wherein each of the tasks of each of said plurality of nodes sets up a base address table with an entry for a base address of a memory buffer associated with said each task.

15. The system according to claim 11, wherein said broadcasting includes sending a put to each of the tasks of each of the nodes to reduce data from said each task to a root node.

16. An article of manufacture comprising:
at least one tangible computer readable device having computer readable program code logic tangibility embodied therein to execute machine instructions in one or more processing units for implementing an asynchronous collective operation in a multi-node data processing system, wherein each of the nodes includes a plurality of processing units and a messaging unit to implement direct memory access to the processing units of others of the nodes, the program code logic, when executing in said one or more processing units, performing the following:
using the messaging unit of one of the nodes to initiate a one sided global collective operation by injecting a remote get descriptor and broadcasting the remote get descriptor from said one of the nodes to a plurality of others of the nodes; and
said remote get descriptor initiating said global collective operation back to a specified one of the nodes wherein data are sent in an asynchronous manner in the data processing system from each of the plurality of nodes to said specified one of the nodes.

17. The article of manufacture according to claim 16, wherein each of said plurality of nodes sets up a base address table with an entry for a base address of a memory buffer associated with said each node.

18. The article of manufacture according to claim 17, wherein each of said plurality of nodes performs only one task in said asynchronous collective operations.

19. The article of manufacture according to claim 17, wherein each of the plurality of destination nodes performs a plurality of tasks in said collective operations, and wherein each of the tasks of each of said plurality of nodes sets up a base address table with an entry for a base address of a memory buffer associated with said each task.

20. The article of manufacture according to claim 19, wherein said broadcasting includes sending a put to each of the tasks of each of the nodes to reduce data from said each task to a root node.

21. A method of implementing an asynchronous collective operation in a multi-node data processing system, wherein each of the nodes includes a plurality of processing units and a messaging unit to implement direct memory access to the processing units of others of the nodes, the method comprising:
using the messaging unit of one of the nodes to initiate a one sided global collective operation by injecting generating a remote get descriptor and broadcasting the remote get descriptor from said one of the nodes to a plurality of others of the nodes; and
said remote get descriptor initiating said global collective operation back to a specified one of the nodes wherein data are sent in an asynchronous manner in the data processing system from each of the plurality of nodes to said specified one of the nodes; and wherein
said broadcasting includes sending a defined communication to said plurality of destination nodes, and injecting the remote get descriptor into said defined communication, said remote get descriptor including a put that reduces data back to said specified one of the nodes during said asynchronous collective operation.

22. The method according to claim 21, wherein each of said plurality of nodes performs only one task in said asynchronous collective operations, and each of said plurality of nodes sets up a base address table with an entry for a base address of a memory buffer associated with said each node.

23. The method according to claim 21, wherein each of the plurality of destination nodes performs a plurality of tasks in said collective operations, and wherein each of the tasks of each of said plurality of nodes sets up a base address table with an entry for a base address of a memory buffer associated with aid each task.

24. The method according to claim 23, wherein said broadcasting includes sending a put to each of the tasks of each of the nodes to reduce data from said each task to the root node.

25. The method according to claim 21, wherein said broadcasting includes said root node injecting said remote get descriptor into said defined communication.

* * * * *